(12) United States Patent
Steiner et al.

(10) Patent No.: US 9,404,200 B2
(45) Date of Patent: Aug. 2, 2016

(54) THERMOCHROMIC BUILD MATERIALS

(71) Applicant: MakerBot Industries, LLC, Brooklyn, NY (US)

(72) Inventors: Robert J. Steiner, Brooklyn, NY (US); Corrie Michelle Van Sice, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 484 days.

(21) Appl. No.: 13/691,460

(22) Filed: Nov. 30, 2012

(65) Prior Publication Data

US 2013/0292881 A1   Nov. 7, 2013

Related U.S. Application Data

(60) Provisional application No. 61/642,745, filed on May 4, 2012.

(51) Int. Cl.
*B32B 27/18* (2006.01)
*B32B 17/02* (2006.01)
*B32B 27/02* (2006.01)
*D01F 6/00* (2006.01)
*B41M 5/34* (2006.01)
*G10L 17/22* (2013.01)
*G10L 15/22* (2006.01)
*B29C 67/00* (2006.01)
*C09D 11/50* (2014.01)
*B33Y 50/02* (2015.01)

(52) U.S. Cl.
CPC .............. *D01F 6/00* (2013.01); *B29C 67/0055* (2013.01); *B29C 67/0088* (2013.01); *B41M 5/34* (2013.01); *C09D 11/50* (2013.01); *G10L 15/22* (2013.01); *G10L 17/22* (2013.01); *B29K 2995/002* (2013.01); *B33Y 50/02* (2014.12); *G10L 2015/223* (2013.01); *Y10T 428/2929* (2015.01)

(58) Field of Classification Search
CPC ................ C09D 11/50; B29C 67/0051–67/08; Y10T 428/2913; Y10T 428/2929
USPC .............. 428/357, 364, 371, 373, 397, 402.2, 428/402.21, 402.22, 402.24, 407, 913; 264/401; 524/543, 547, 570, 571, 575, 524/585, 587, 599; 425/143; 252/583, 586
See application file for complete search history.

(56) References Cited

U.S. PATENT DOCUMENTS

2006/0100395 A1*   5/2006   Aritake ......................... 525/450
2010/0234494 A1*   9/2010   Fischer et al. ................ 524/100
2010/0283172 A1*  11/2010   Swanson ......................... 264/80

OTHER PUBLICATIONS

Vance, 3-D Brings a Wow Factor to Printing, 12 Jan. 2011, The New York Times http://www.nytimes.com/2011/01/13/technology/personaltech/13basics.html?_r=0, accessed Jun. 27, 2015.*
Barker, Thermochromics from the Hallcrest Group, Material Inspirations, Q3, No. 9, 2008.*
Hough, The Plastics Compendium, HDPE, 1995, vol. 1, pp. 72-73.*
Casey, 3D Printing is reshaping package design and prototyping, Jul. 31, 2009, http://www.packagingdigest.com/packaging-design/3d-printing-reshaping-package-design-and-prototyping, accessed Jun. 27, 2015.*

* cited by examiner

*Primary Examiner* — Jennifer Chriss
*Assistant Examiner* — Frank Vineis
(74) *Attorney, Agent, or Firm* — Strategic Patents, P.C.

(57) ABSTRACT

A variety of thermochromic build materials are disclosed for use in color-controlled three-dimensional printing. By providing materials that exhibit a final color dependent upon heat applied during a melt or extrusion process, objects can be fabricated having a user-controlled color that varies from object to object, or within a single object.

9 Claims, 4 Drawing Sheets

THERMOCHROMIC BUILD MATERIALS

RELATED APPLICATIONS

This application claims the benefit of U.S. App. No. 61/642,745 filed on May 4, 2012, the entire content of which is hereby incorporated by reference.

BACKGROUND

There remains a need for improved build materials that provide various color-changing capabilities.

SUMMARY

A variety of thermochromic build materials are disclosed for use in color-controlled three-dimensional printing. By providing materials that exhibit a final color dependent upon heat applied during a melt or extrusion process, objects can be fabricated having a user-controlled color that varies from object to object, or within a single object.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
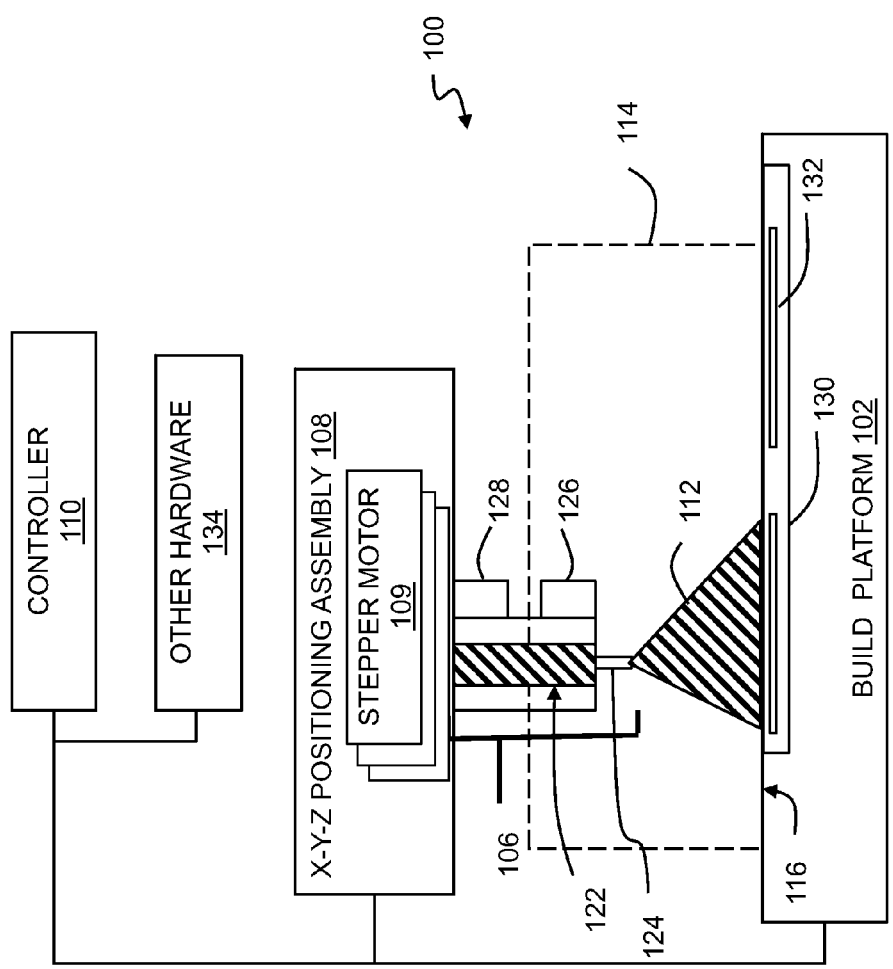
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
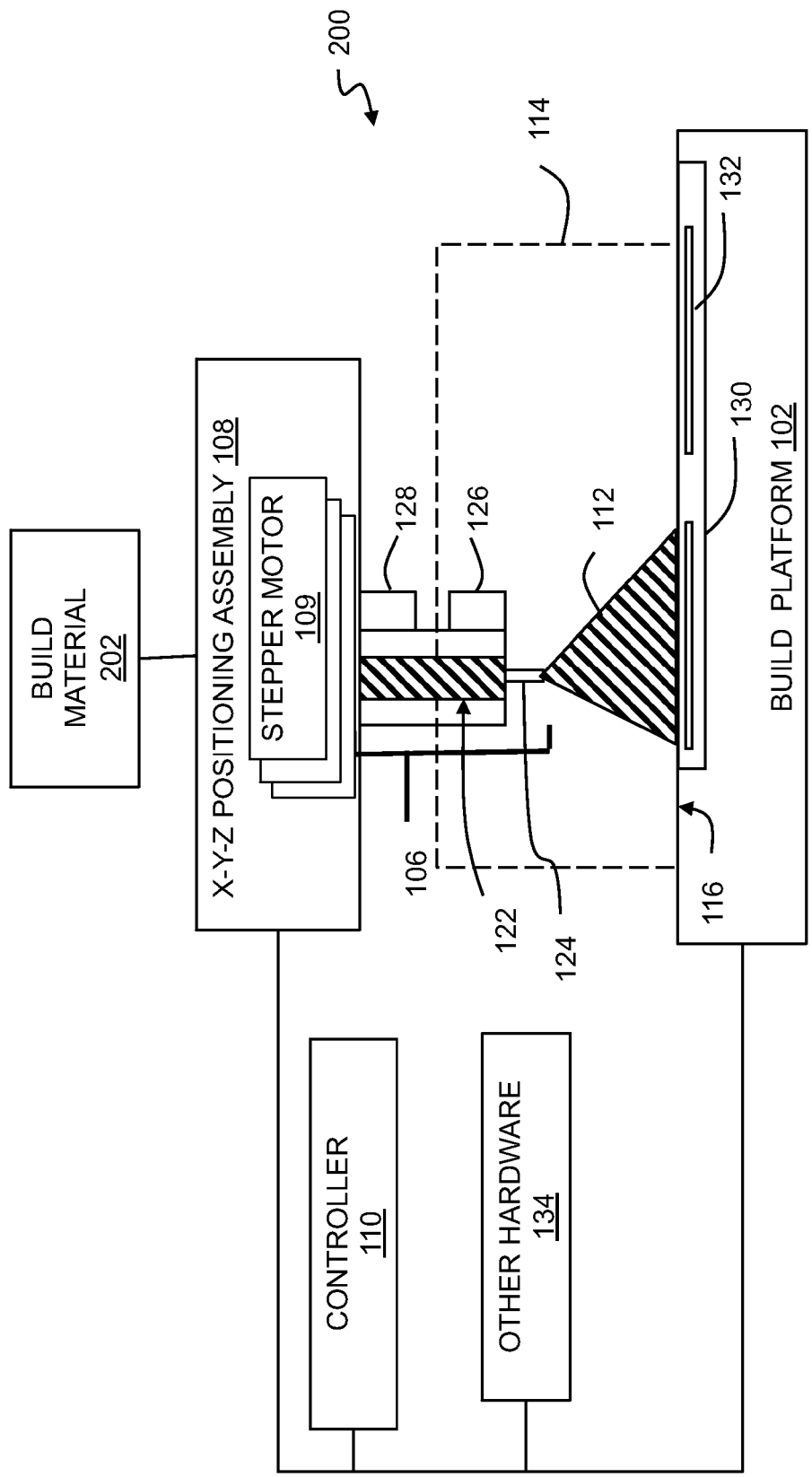
FIG. 2 shows a three-dimensional printer with a thermochromic build material.

FIG. 2 shows a three-dimensional printer with a thermochromic build material. In general, a printer 200 such as any of the printers described above may be configured to use a supply of thermochromic build material 202 in order to control color of a fabricated object, or to vary color within a fabricated object, by controlling the heat applied to a build material during an extrusion process, e.g., during a melting, liquification or the like. Thus in one aspect there is disclosed herein a three-dimensional printer including a supply of thermochromic build material, an extruder with a heating element that heats the thermochromic material, thereby providing heated build material; and a controller coupled to the heating element and configured to heat the heating element to a predetermined temperature, wherein the predetermined temperature is selected to concurrently melt the heated build material and effect an irreversible color change in the material after extrusion.

It will be understood that where spatial control of color variations is desired, the controller may further be configured to receive user specifications of a spatial color pattern (e.g., in two or three dimensions), or a digital image or the like containing color-varying patterns, and apply these colors to derive corresponding instructions to vary the heat of the thermochromic build material as it is deposited onto an object during fabrication. Two-dimensional images may, for example, be surface mapped onto an object, projected onto the surface of the object, or projected through an object, or combinations of these, in any user-desired fashion. A variety of techniques for controlling color during fabrication based upon, e.g., digital images or other data sources, are described by way of example in commonly-owned U.S. patent application Ser. No. 13/478,233 filed on May 23, 2012, the entire content of which is hereby incorporated by reference. In general, an x-y-z positioning assembly or the like may be coordinated with thermal control to deposit a plurality of (post-extrusion) colors of a thermochromic material at predetermined positions within an object thereby achieving spatially-controlled color distributions according to any predetermined or user-desired patterns. Transitions from one color to another, where present for a particular thermochromic build material, may be positioned within infill of an object's interior volume, between external surfaces of the object where the transition would otherwise be visible.

The thermochromic build material in the supply 202 may take a variety of forms. In terms of bulk properties, the thermochromic build material may be shaped and sized for use with an extrusion-based three-dimensional printer. This may, for example include a filament or other feedstock, which may be wound about a spool with a center opening for rotatably coupling to a spindle. The thermochromic build material may also or instead be pellets or other pelletized or granular materials that can be melted or otherwise transformed for deposition in a controlled manner to fabricate a three-dimensional object.

In another aspect, a variety of techniques are known for temperature-based control of color, any of which may be suitably adapted for use in a thermochromic build material as contemplated herein. For example, the thermochromic build material may include a polymer composition that irreversibly changes color in response to applied thermal energy. This may include a polymer combined with a thermochromic material that imparts a color that varies according to a temperature applied to the build material during an extrusion process.

The polymer may be any polymer suitable for an extrusion process including without limitation acrylonitrile butadiene styrene (ABS), polylactic acid (PLA), high-density polyethylene, or any other plastic, thermoplastic, or the like, as well as combinations of the foregoing.

The thermochromic material may be any additive that either independent from the polymer (or other matrix, binder, or the like for the thermochromic material) or in combination with the polymer yields a color to the composite material that can change color according to an applied temperature. It will be understood that the color change referred to herein is a final color at ambient temperature after processing. That is, in order to achieve control over color in fabricated objects, the thermochromic additive should yield a controllable, irreversible change in color at ambient temperature so that objects with varying, controlled colors can be fabricated. Certain thermochromic materials may also or instead exhibit numerous color changes during a heating and liquification process, although such colors will not usefully result in a color-controlled object unless the changes are wholly or partially irreversible once ambient temperature is once again attained. Thus in one aspect, the thermochromic material preferably includes an irreversible thermochromic composition.

In one aspect, the thermochromic material may include an encapsulated dye that ruptures under applied temperature. In one aspect, such dyes may have a first color, and be encapsulated in an opaque capsule with a second color so that an aggregate transition from the second color (of the capsule) and the first color (of the dye) may be controlled via temperature during extrusion. In general, the capsules preferably rupture within a range of temperatures coincident with the melt temperature of the corresponding polymer or other material with which the thermochromic material is combined.

In another aspect, a material with inherent bulk thermochromic properties may be used as the thermochromic material. For example, polythiophenes result from polymerization of thiophenes, and exhibit various optical properties including various absorption and fluorescence spectra that result in, inter alia, temperature dependent color changes. Liquid crystals and leuco dyes are also known for use in a variety of thermally-dependent temperature changing applications.

More generally, a variety of thermochromic properties are known for a variety of materials, and any such material that exhibits a change in color due to a change in temperature, preferably an irreversible change in color due to a change in temperature, may be used as a thermochromic material as contemplated herein. Such color changes may result from changes to crystalline or other molecular structures that affect, e.g., Bragg diffraction, shifts in absorption spectrum, and so forth , or other any other changes in light reflection, scattering, absorption and the like that change as a molecular and/or crystalline structure changes with temperature. In addition, higher order structures in a bulk material may be achieved by an interaction of a polymer with an incorporated non-thermochromic additive that result in a thermochromic effect in a resulting composition. Similarly, a thermochromic additive may burn or char under temperature to achieve an irreversible color change or a general darkening or the like of the additive and the resulting composition.

A variety of commercially available irreversible thermochromic pigments, inks and dyes are also known for industrial applications such as time-temperature indications on packaging and the like. All such materials suitable for thermal control under conditions corresponding to operating parameters for a three-dimensional printer may be used as a thermochromic material as contemplated herein.

Other thermochromic materials are known in the art. For example, irreversible thermochromic behavior has been observed in gold and silver nanorod/polymeric ionic liquid nanocomposite films. Irreversible thermochromic behavior has also been observed in certain monoalcohol, diol, and monoester compounds of diacetylenes. Any such materials exhibiting thermochromic behavior in temperature ranges suitable for use in three-dimensional build materials may be adapted for use as contemplated herein.

Figure 3:
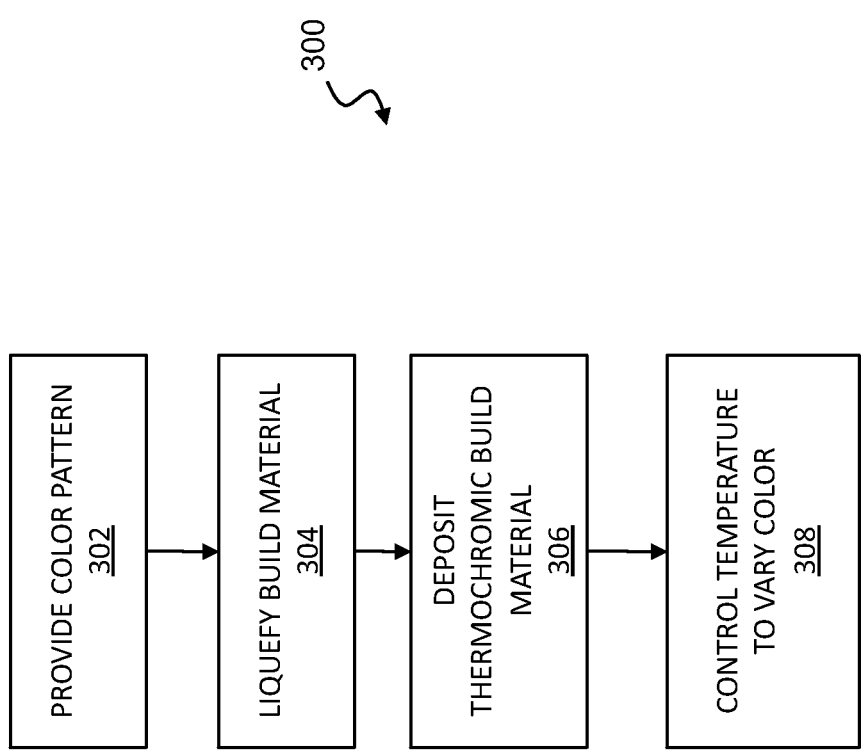
FIG. 3 shows a method for three-dimensional printing using a thermochromic build material.

FIG. 3 shows a method for three-dimensional printing using a thermochromic build material.

As shown in step 304, the method 300 may include providing a color pattern 302 for an object. This may be omitted, or may include a single color for an entire object. This may instead include a pattern based upon, e.g., an image or any other data providing a user-specified, spatial color distribution for an object.

As shown in step 304, the method 300 may include liquefying a thermochromic build material at a predetermined temperature to obtain a predetermined, irreversible color change in the thermochromic build material. It will be understood that liquification may include application of a range of temperatures according to a particular build material being used. It will also be understood that certain build materials may be liquid at an ambient temperature, or may only produce a limited liquification or flowability at extrusion temperatures. All such variations are intended to fall within the scope of liquification as used herein, and liquification may be omitted under certain conditions without departing from the scope of this disclosure, e.g., where a material is provided in an already liquid or flowable state.

It will also be appreciated that a color change need not occur at any particular moment during liquification, extrusion, and cooling. For example, a predetermined, irreversible color change may not manifest until after cooling of a thermochromic build material to an ambient temperature. In another aspect, the predetermined, irreversible color change may occur upon heating of the thermochromic build material to a temperature such as the predetermined temperature for liquification. Given the variety of thermochromic materials and combinations of thermochromic materials known in the art, it should also be readily appreciated that chromism may exhibit some degree of hysteresis, e.g., so that the rate of temperature change, maximum temperature, and amount of time at one or more different temperatures may also affect a final, irreversible color that is achieved when a thermochromic build material returns to an ambient temperature. It should further be understood that a final, irreversible color for a thermochromic build material at ambient temperature may itself be variable. That is, the final color may be a temperature-dependent, varying color that changes color, for example, over a range of ambient temperatures. A center color for such a range of temperature-dependent color changes may, for example, be controlled by a highest temperature to which a material was heated. All such variations are intended to fall within the meaning of a thermochromic material as that term is used herein unless a different meaning is explicitly provided or otherwise clear from the context.

By way of example, a material may become flowable at about 100 deg. C, at which temperature the material may be blue. At a temperature of 110 deg. C, the material may become blue-green. At a temperature of 120 deg. C, the material may become green. The final color for a fabricated object, or portion of an object, may be controlled by heating the material to the appropriate, corresponding temperature during extrusion. Where color adjustments are called for according to a model or other user-provided information, the temperature can be moved up or down within this range to move towards various colors.

As shown in step 306, the method 300 may include depositing the thermochromic build material within a working volume of a three-dimensional printer. This may in general include controlling an extrusion tool or the like as described above in order to spatially control material deposition in a manner that fabricates a three-dimensional object.

As shown in step 308, the method 300 may include controlling the predetermined temperature to vary a color of the thermochromic material according to the color pattern during fabrication of the three-dimensional object. As noted above, where a particular image or other color pattern is desired, the temperature applied to a build material during an extrusion process or the like may be controlled in corresponding fashion to achieve a corresponding color pattern on a fabricated object. In this manner, a fabrication process may be controlled to provide an object having a predetermined color at a predetermined location, or more generally a distribution of colors according to a desired, predetermined pattern.

Figure 4:
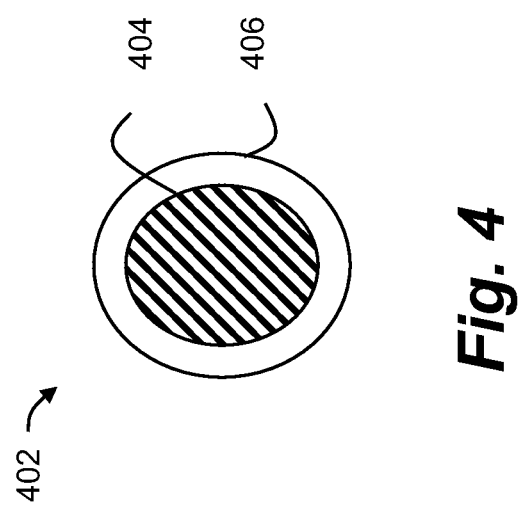
FIG. 4 shows a cross section of a polymer-thermochromic composite build material.

FIG. 4 shows a cross section of a polymer-thermochromic composite build material. While a thermochromic material may be mixed or otherwise distributed within a polymer build material, a thermochromic material may also or instead be disposed about an exterior of a polymer extrusion of the like to provide a color-sensitive composite. This fabrication technique advantageously permits the manufacture of a polymer filament with an elevated-temperature extrusion process and a subsequent, lower-temperature coating process for the thermochromic build material, which prevents the preliminary, elevated-temperature steps from imparting an irreversible color change to the thermochromic material prior to use by a three-dimensional printer or the like.

In general, the thermochromic build material 402 may include a core 404 of a polymer or any other suitable material, along with a sleeve 406 of thermochromic material. The sleeve 406 may in general be any coating, sleeve, cladding, surface or the like that can be fabricated on an exterior of the core 404 using e.g. a dipping process, deposition process, spray process, rolling process, cold extrusion process, as well as combinations of the foregoing and/or any other suitable technique(s).

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A build material for three-dimensional printing comprising:
   a polymer shaped and sized for use with an extrusion-based three-dimensional printer; and
   a thermochromic material combined with the polymer, the thermochromic material imparting a color to the build material that varies according to a temperature applied to the build material during an extrusion process, the thermochromic material including one or more encapsulated dyes that rupture within a temperature coincident with a liquification temperature of the polymer thereby providing a final color to an extruded material after the build material is liquified during the extrusion process.

2. The build material of claim 1 wherein the polymer and the thermochromic material are combined into a filament, the build material further comprising a spool about which the filament is wound, the spool including a center opening for rotatably coupling to a spindle.

3. The build material of claim 2 wherein the polymer forms a core of the filament and the thermochromic material surrounds the core.

4. The build material of claim 1 wherein the polymer includes acrylonitrile butadiene styrene.

5. The build material of claim 1 wherein the polymer includes polylactic acid.

6. The build material of claim 1 wherein the polymer includes high-density polyethylene.

7. The build material of claim 1 wherein the polymer includes one or more of a plastic and a thermoplastic.

8. The build material of claim 1 wherein the thermochromic material includes an irreversible thermochromic composition.

9. The build material of claim 1 wherein the thermochromic material includes a non-thermochromic additive incorporated into the polymer to yield a thermochromic bulk material that provides a thermochromic effect under applied temperature.

* * * * *